United States Patent
Kosaka et al.

(10) Patent No.: US 12,111,215 B2
(45) Date of Patent: Oct. 8, 2024

(54) IMAGING DEVICE AND CALIBRATION METHOD

(71) Applicant: SONY SEMICONDUCTOR SOLUTIONS CORPORATION, Kanagawa (JP)

(72) Inventors: Takuro Kosaka, Kanagawa (JP); Naoki Kawazu, Kanagawa (JP); Takumi Oka, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 380 days.

(21) Appl. No.: 17/309,873

(22) PCT Filed: Dec. 9, 2019

(86) PCT No.: PCT/JP2019/048063
§ 371 (c)(1),
(2) Date: Jun. 24, 2021

(87) PCT Pub. No.: WO2020/144996
PCT Pub. Date: Jul. 16, 2020

(65) Prior Publication Data
US 2022/0074797 A1 Mar. 10, 2022

(30) Foreign Application Priority Data

Jan. 10, 2019 (JP) .................. 2019-002937

(51) Int. Cl.
*G01K 15/00* (2006.01)
*G01J 1/44* (2006.01)
(Continued)

(52) U.S. Cl.
CPC .......... *G01K 15/005* (2013.01); *H04N 23/11* (2023.01); *H04N 25/77* (2023.01); *G01J 2001/444* (2013.01); *G01S 7/497* (2013.01)

(58) Field of Classification Search
CPC .... G01K 15/005; G01K 2219/00; G01K 7/01; H04N 23/11; H04N 25/77; H04N 25/75; H04N 25/63; G01J 2001/444; G01S 7/497
See application file for complete search history.

(56) References Cited

U.S. PATENT DOCUMENTS 6,614,562 B1 9/2003 Minemier
2011/0221931 A1* 9/2011 Wakabayashi ...... H03M 1/0621
348/E5.037
(Continued)

FOREIGN PATENT DOCUMENTS

CN 107888808 A 4/2018
JP 07-327174 A 12/1995
(Continued)

OTHER PUBLICATIONS

International Search Report and Written Opinion of PCT Application No. PCT/JP2019/048063, issued on Feb. 4, 2020, 12 pages of ISRWO.

*Primary Examiner* — Thanh Luu
*Assistant Examiner* — Monica T Taba
(74) *Attorney, Agent, or Firm* — CHIP LAW GROUP

(57) ABSTRACT

An imaging device (1) according to the present disclosure includes a pixel array unit (10) that includes a pixel, an analog signal generation unit, an A/D conversion unit (23), and a switch. The analog signal generation unit generates an analog signal based on a temperature around the pixel array unit (10). The A/D conversion unit (23) converts the analog
(Continued)

signal into a digital signal. The switch cuts off the analog signal to be supplied to the A/D conversion unit.

8 Claims, 12 Drawing Sheets

(51) Int. Cl.
*G01S 7/497* (2006.01)
*H04N 23/11* (2023.01)
*H04N 25/77* (2023.01)

(56) References Cited

U.S. PATENT DOCUMENTS

| | | |
|---|---|---|
| 2011/0268151 A1 | 11/2011 | Hadwen |
| 2012/0104229 A1 | 5/2012 | Kwon |
| 2013/0070805 A1 | 3/2013 | Coln |
| 2013/0170520 A1 | 7/2013 | Englasyam |
| 2017/0339360 A1* | 11/2017 | Cho ............ H03M 5/02 |
| 2018/0097960 A1* | 4/2018 | Ochiai ........ H04N 1/00978 |
| 2018/0238740 A1 | 8/2018 | Christel |

FOREIGN PATENT DOCUMENTS

| | | |
|---|---|---|
| JP | 2005316530 A | 11/2005 |
| JP | 2008-141325 A | 6/2008 |
| JP | 2010-193296 A | 9/2010 |
| JP | 2011188224 A | 9/2011 |
| JP | 2012-175408 A | 9/2012 |
| JP | 2012-220437 A | 11/2012 |
| JP | 2013-150144 A | 8/2013 |
| JP | 2014086000 A | 5/2014 |
| JP | 2016031274 A | 3/2016 |
| TW | 200629890 A | 8/2006 |

* cited by examiner

IMAGING DEVICE AND CALIBRATION METHOD

CROSS REFERENCE TO RELATED APPLICATIONS

This application is a U.S. National Phase of International Patent Application No. PCT/JP2019/048063 filed on Dec. 9, 2019, which claims priority benefit of Japanese Patent Application No. JP 2019-002937 filed in the Japan Patent Office on Jan. 10, 2019. Each of the above-referenced applications is hereby incorporated herein by reference in its entirety.

TECHNICAL FIELD

The present disclosure relates to an imaging device and a calibration method.

BACKGROUND ART

In recent years, there is a technology for performing calibration of a temperature sensor by acquiring a value of temperature data output as a predetermined test temperature in advance in the temperature sensor mounted on an imaging device or the like (for example, see PTL 1).

CITATION LIST

Patent Literature

[PTL 1] JP 2012-220437 A

SUMMARY

Technical Problem

However, in the technology of the related art, when the number of test temperatures at which calibration is performed is increased to improve accuracy of the temperature sensors, a large amount of time or equipment is necessary for the calibration. Therefore, there is a concern about an increase in manufacturing cost.

Accordingly, the present disclosure proposes an imaging device and a calibration method capable of improving the accuracy of calibration without an increase in the number of test temperatures at which the calibration is performed.

Solution to Problem

According to an aspect of the present invention, an imaging device is provided. The imaging device includes a pixel array unit including pixels, an analog signal generation unit, an A/D conversion unit, and a switch. The analog signal generation unit generates an analog signal based on a temperature around the pixel array unit. The A/D conversion unit converts the analog signal into a digital signal. The switch cuts off the analog signal to be supplied to the A/D conversion unit.

According to an aspect of the present invention, a calibration method is provided. The calibration method includes a signal cutting step, a first A/D conversion step, an analog signal outputting step, a second A/D conversion step, and a calculation step. In the signal cutting step, an analog signal generated based on a temperature is cut off. In the first A/D conversion step, the cutoff analog signal is converted into a first digital signal. In the analog signal outputting step, the analog signal is output. In the second A/D conversion step, the analog signal is converted into a second digital signal. In the calculation step, a parameter of a correction calculation expression for correcting a digital signal obtained through A/D conversion from an analog signal generated based on a temperature around a pixel array unit is calculated based on the first and second digital signals.

Advantageous Effects of Invention

According to the present disclosure, it is possible to improve the accuracy of calibration without an increase in the number of test temperatures at which the calibration is performed. The advantageous effects described here are not necessarily limited and other advantageous effects desired to be described in the present disclosure may be obtained.

DESCRIPTION OF EMBODIMENTS

Figure 1:
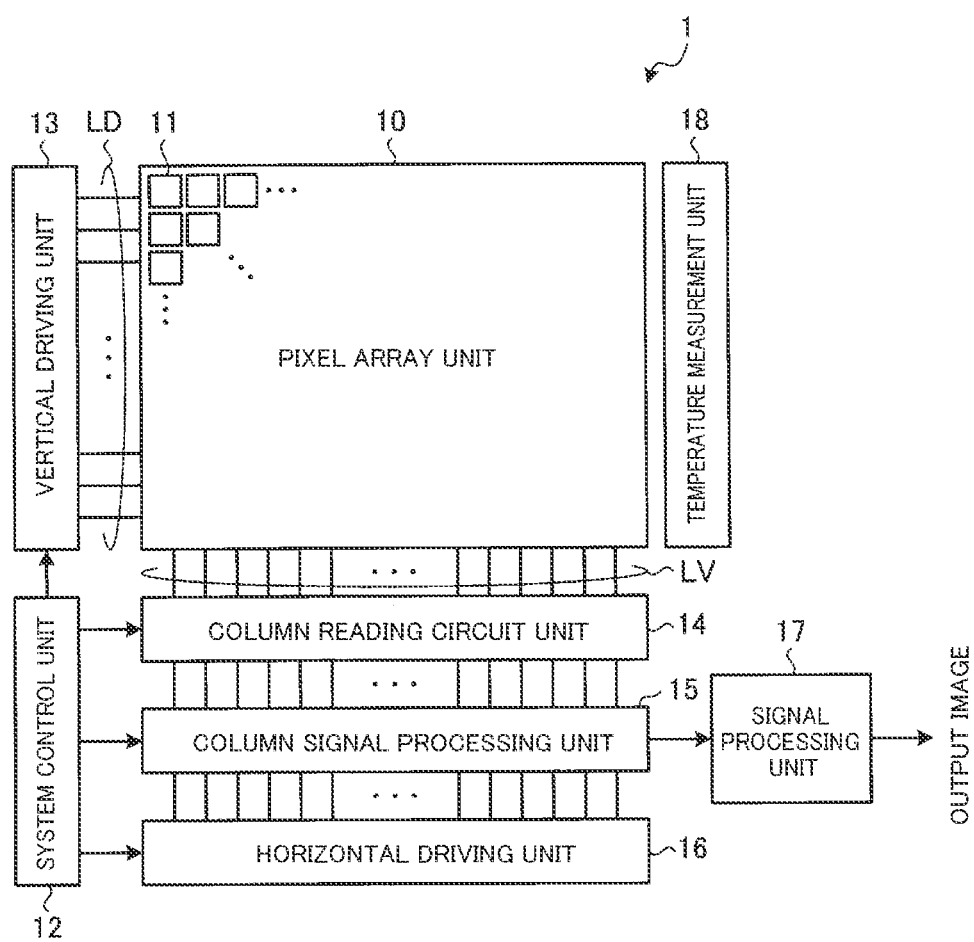
FIG. 1 is a system configuration diagram illustrating an overall configuration example of an imaging device according to an embodiment of the present disclosure.

Hereinafter, each embodiment of the present disclosure will be described in detail with reference to the drawings. In each of the following embodiments, the same reference numerals are given to the same units and repeated description thereof will be omitted.

In recent years, there is a technology for performing calibration of a temperature sensor by acquiring a value of temperature data output as a predetermined test temperature in advance in the temperature sensor mounted on an imaging device or the like.

However, in the technology of the related art, when the number of test temperatures at which calibration is performed is increased to improve accuracy of the temperature sensors, a large amount of time or equipment is necessary for the calibration. Therefore, there is a concern about an increase in manufacturing cost.

On the other hand, when the number of test temperatures at which calibration is performed is reduced, it is difficult to obtain parameters of a correction calculation expression for correcting temperature data with high accuracy. Thus, it is difficult to improve the accuracy of a temperature sensor.

Accordingly, an improvement in accuracy of calibration is expected without an increase in the number of test temperatures at which the calibration is performed.

EMBODIMENT

[Configuration of Imaging Device]

FIG. 1 is a system configuration diagram illustrating an overall configuration example of an imaging device 1 according to an embodiment of the present disclosure. As illustrated in FIG. 1, the imaging device 1 which is a CMOS image sensor includes a pixel array unit 10, a system control unit 12, a vertical driving unit 13, a column reading circuit unit 14, a column signal processing unit 15, a horizontal driving unit 16, a signal processing unit 17, and a temperature measurement unit 18.

The pixel array unit 10, the system control unit 12, the vertical driving unit 13, the column reading circuit unit 14, the column signal processing unit 15, the horizontal driving unit 16, the signal processing unit 17, and the temperature measurement unit 18 are provided on the same semiconductor substrate or a plurality of stacked semiconductor substrates which are connected electrically.

In the pixel array unit 10, effective unit pixels (hereinafter referred to as "unit pixels") 11 that include photoelectric conversion elements (photodiodes) capable of photoelectrically converting and accumulating a charge amount in accordance with an amount of incident light and outputting the charge amount as a signal are arrayed 2-dimensionally in a matrix form. The unit pixel 11 is an example of a pixel.

The pixel array unit 10 may include a region in which dummy unit pixels with a structure that has no photodiodes, light-shielding unit pixels in which incident light is blocked from the outside by shielding a light reception surface from light, and the like are disposed in a row and/or column form in addition to the effective unit pixels 11.

The light-shielding unit pixels may have a similar configuration to the effective unit pixels 11 except for the structure in which the light reception surface is shielded from light. Hereinafter, photocharges with a charge amount in accordance with an amount of incident light are simply referred to as "charges" and the unit pixels 11 are simply referred to as "pixels" in some cases.

In the pixel array unit 10, a pixel driving line LD is formed for each row in the right and left directions (an array direction of the pixels in the pixel row) in the drawing and a vertical pixel wiring LV is formed for each column in the upper and lower directions (an array direction of the pixels in the pixel column) in the drawing in the pixel array of the matrix form. One end of the pixel driving LD is connected to an output end corresponding to each row of the vertical driving unit 13.

The column reading circuit unit 14 includes at least a circuit that supplies a constant current to the unit pixels 11 for each column in a selected row in the pixel array unit 10, a current mirror circuit, and a switching switch of the unit pixels 11 which is a reading target.

The column reading circuit unit 14 forms an amplifier along with a transistor in a selected pixel in the pixel array unit 10, switches a photocharge signal into a voltage signal, and outputs the voltage signal to the vertical pixel wiring LV.

The vertical driving unit 13 includes a shift register or an address decoder and drives all the unit pixels 11 of the pixel array unit 10 simultaneously or each unit pixel 11 in a row unit or the like. The vertical driving unit 13 includes a reading scan system, a sweeping scan system, or a batch sweeping and batch transferring system although a specific configuration is not illustrated.

The reading scan system selects and scans the unit pixels 11 of the pixel array unit 10 in order in the row unit to read pixel signals from the unit pixels 11. In the case of row driving (a rolling shutter operation), for sweeping, sweeping scanning is performed earlier by a time of a shutter speed than reading scanning in a reading row in which reading scanning is performed by a reading scanning system.

In the case of global exposure (a global shutter operation), batch sweeping is performed earlier by a time of a shutter speed than batch transferring. Through the sweeping, unnecessary charges are swept (reset) from the photodiodes of the unit pixels 11 in a reading row. Through sweeping (resetting) of unnecessary charges, a so-called electronic shutter operation is performed.

Here, the electronic shutter operation is an operation of discarding unnecessary photocharges collected in the photodiodes until just before and newly starting exposure (starting accumulation of photocharges).

A signal read through the reading operation in the reading scanning system corresponds to an amount of light incident after the immediately previous reading operation or the electronic shutter operation. In the case of row driving, a period from a reading timing in the immediately previous reading operation or a sweeping timing in the electronic shutter operation to a reading timing in a present reading operation is an accumulation time (an exposure time) of the photocharges in the unit pixels 11. In the case of global exposure, a time from the batch sweeping to batch transferring is an accumulation time (an exposure time).

A pixel signal output from each unit pixel 11 in a pixel row selected and scanned by the vertical driving unit 13 is supplied to the column signal processing unit 15 through each vertical pixel wiring LV. The column signal processing unit 15 performs predetermined signal processing on the pixel signal output from each unit pixel 11 in the selected row via the vertical pixel wiring LV for each pixel column of the pixel array unit 10 and temporarily retains the pixel signal after signal processing.

Specifically, the column signal processing unit 15 performs at least noise removal, for example, CDS (correlated double sampling) as signal processing. Through the CDS processing by the column signal processing unit 15, fixed pattern noise specific to the pixels such as reset noise or a variation in a threshold of an amplification transistor AMP is removed.

Figure 8:
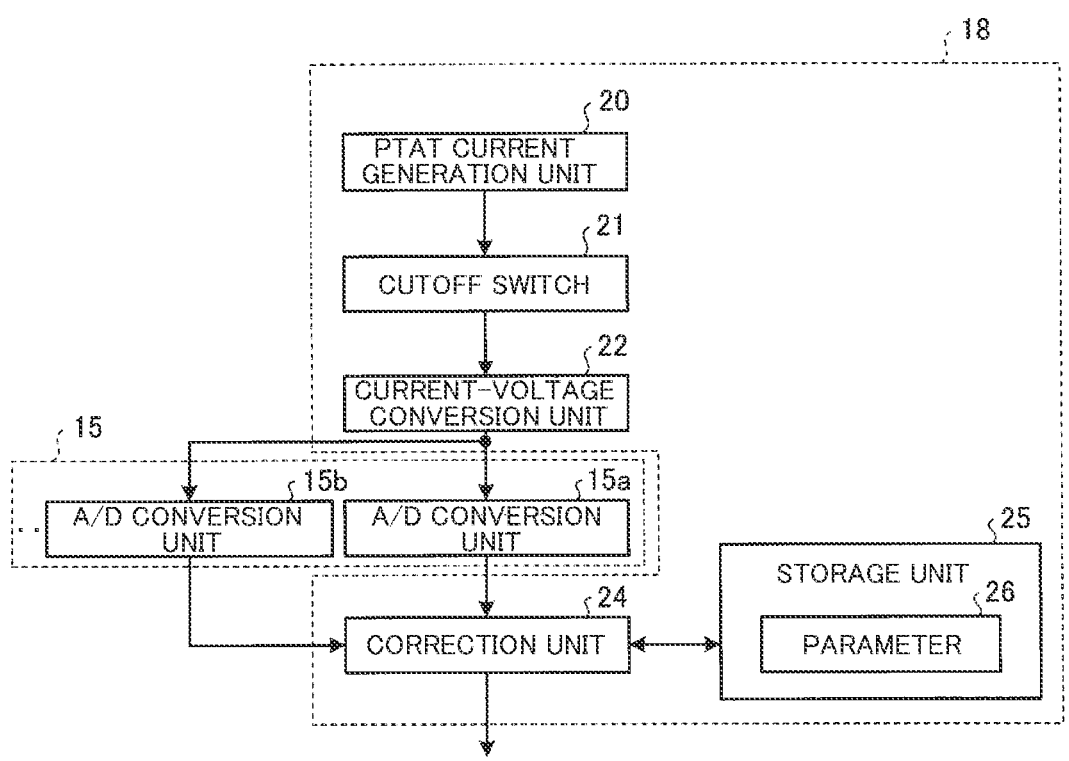
FIG. 8 is a system configuration diagram illustrating an overall configuration example of a temperature measurement unit according to Modification Example 4 of the embodiment of the present disclosure.

The column signal processing unit 15 includes a plurality of A/D conversion units 15a, 15b, and the like (see FIG. 8). The plurality of A/D conversion units 15a, 15b, and the like perform A/D conversion on the pixel signals generated by the unit pixels 11 into the digital pixel signal.

The horizontal driving unit 16 includes a shift register or an address decoder and sequentially selects unit pixels corresponding to the pixel columns of the column signal processing unit 15. Through the selection scanning by the horizontal driving unit 16, digital pixel signals processed by the column signal processing unit 15 are sequentially output to the signal processing unit 17.

The system control unit 12 includes a timing generator that generates various timing signals. The system control unit 12 performs driving control on the vertical driving unit 13, the column reading circuit unit 14, the column signal processing unit 15, and the horizontal driving unit 16 based on various timing signals generated by the timing generator.

The imaging device 1 further includes the signal processing unit 17, a data storage unit (not illustrated), and the temperature measurement unit 18. The signal processing unit 17 has at least an addition processing function and performs various kinds of signal processing such as addition processing on the pixel signals output from the column signal processing unit 15.

The data storage unit temporarily stores data necessary for signal processing when the signal processing unit 17 performs the signal processing. The signal processing unit 17 and the data storage unit may be processes by an external signal processing unit, for example, a DSP (Digital Signal Processor), or software provided on a different substrate from the imaging device 1 or may be mounted on the same substrate as the imaging device 1.

The temperature measurement unit 18 is provided near the pixel array unit 10, measures temperature around the pixel array unit 10, and outputs the temperature data based on the measured temperature as a digital signal. The temperature data is an example of a digital signal. The details of the temperature measurement unit 18 will be described later.

In the imaging device 1 according to the embodiment, a fail-safe operation at low temperature or high temperature can be performed based on the temperature data around the pixel array unit 10 output from the temperature measurement unit 18.

The fail-safe operation is, for example, an operation of stopping the imaging device 1 at low temperature or high temperature or an operation of sending an error signal to give a warning to the outside. Thus, it is possible to realize the imaging device 1 with high reliability.

In the imaging device 1 according to the embodiment, temperature information around the pixel array unit 10 output from the temperature measurement unit 18 in various kinds of signal processing of the column signal processing unit 15, the signal processing unit 17, and the like can be added to parameters.

For example, in noise reduction, shading correction, or the like, the temperature information around the pixel array unit 10 can be added to parameters. Thus, it is possible to perform various kinds of signal processing with high accuracy.

[Configuration of Temperature Measurement Unit]

Figure 2:
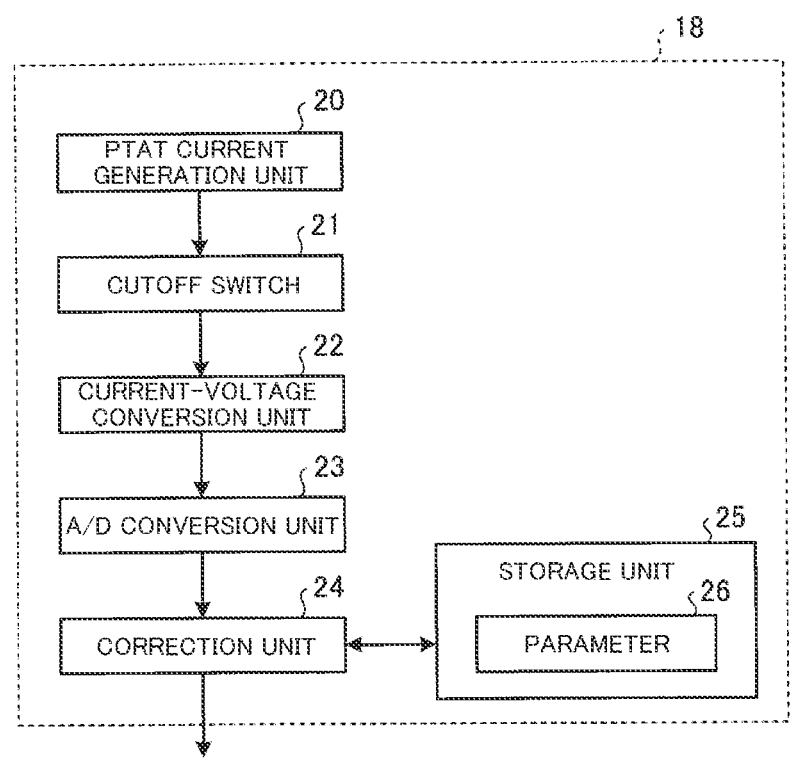
FIG. 2 is a system configuration diagram illustrating an overall configuration example of a temperature measurement unit according to the embodiment of the present disclosure.

Next, the details of the temperature measurement unit 18 will be described with reference to FIGS. 2 and 3. FIG. 2 is a system configuration diagram illustrating an overall configuration example of the temperature measurement unit 18 according to the embodiment of the present disclosure.

As illustrated in FIG. 2, the temperature measurement unit 18 includes a PTAT (Proportional To Absolute Temperature) current generation unit 20, a cutoff switch 21, a current-voltage conversion unit 22, an A/D conversion unit 23, a correction unit 24, and a storage unit 25. The PTAT current generation unit 20 is an example of an analog signal generation unit and the cutoff switch 21 is an example of a switch.

The PTAT current generation unit 20 outputs a PTAT current Ip (see FIG. 3) based on a temperature around the pixel array unit 10. The PTAT current Ip is an example of an analog signal. The PTAT current generation unit 20 outputs, for example, the PTAT current Ip which is a current value proportional to an absolute temperature around the pixel array unit 10.

Figure 3:
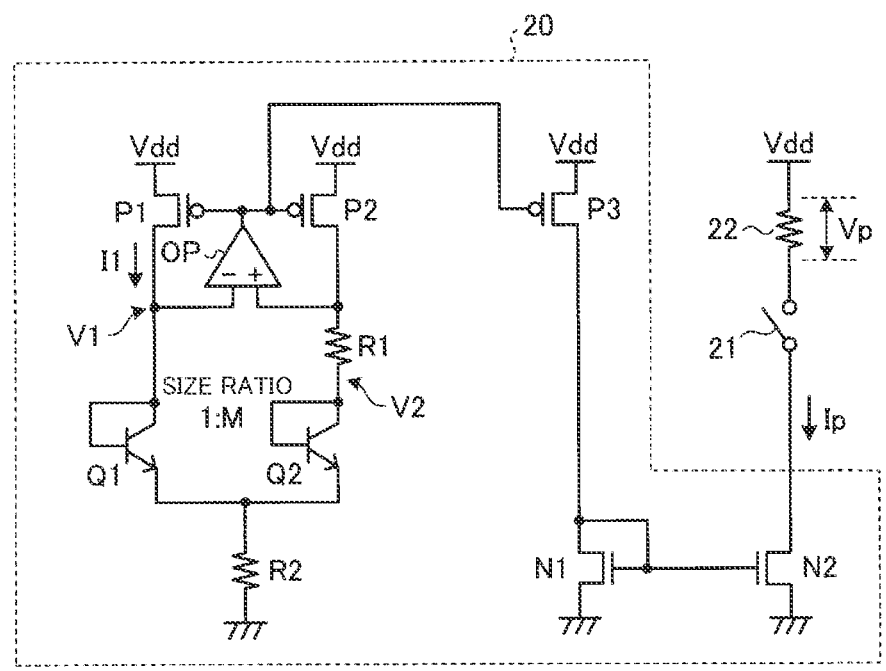
FIG. 3 is a circuit diagram illustrating a configuration of a PTAT current generation unit, a cutoff switch, and a current-voltage conversion unit according to the embodiment of the present disclosure.

FIG. 3 is a circuit diagram illustrating a configuration of the PTAT current generation unit 20, the cutoff switch 21, and the current-voltage conversion unit 22 according to the embodiment of the present disclosure. As illustrated in FIG. 3, the PTAT current generation unit 20 includes npn-type bipolar transistors Q1 and Q2, resistors R1 and R2, p-type MOS transistors P1 to P3, an operational amplifier OP, and n-type MOS transistors N1 and N2. In the following description, the respective resistors are referred to as the transistors Q1 and Q2, the transistors P1 to P3, and the transistors N1 and N2.

A base of the transistor Q1 and a collector of the transistor Q2 are short-circuited. Thus, the transistors Q1 and Q2 form one pn junction diode.

An anode of the diode formed by the transistor Q1 is connected to a negative input terminal of the operational amplifier OP and a drain of the transistor P1. An anode of a diode formed by the transistor Q2 is connected to one end of the resistor R1.

The transistor Q2 is formed with a size ratio (a junction area) which is M times the size of the transistor Q1. The value of the size ratio M is a value for determining characteristics of the temperature measurement unit 18 and is appropriately determined so that specifications required for the temperature measurement unit 18 are satisfied.

One end of the resistor R1 is connected to the collector of the transistor Q2 and the other end of the resistor R1 is connected to a positive input terminal of the operational amplifier OP and a drain of the transistor P2.

The positive input terminal of the operational amplifier OP is connected to the other end of the resistor R1 and is connected to the drain of the transistor P2. The negative input terminal of the operational amplifier OP is connected to an emitter of the transistor Q1 and the drain of the transistor P1. An output terminal of the operational amplifier OP is connected to the gates of the transistors P1 and P2.

In the embodiment, p-type MOS transistors with the same size are used as the transistors P1 to P3. The gates of the transistors P1 to P3 are short-circuited and the sources of the transistors P1 to P3 are connected to a power voltage Vdd.

Next, a circuit operation of the PTAT current generation unit 20 will be described. The operational amplifier OP operates so that potentials of the positive input terminal and the negative input terminal are equal (virtual short-circuiting). That is, the operational amplifier OP controls voltages of the gates of the mutually short-circuited transistors P1 and P2 so that the voltages of the drains of the transistors P1 and P2 are equal.

The currents of the drains of the transistors P1 and P2 are controlled by controlling the voltages of the gates of the transistors P1 and P2. Here, since gate-source voltages Vgs of the transistors P1 and P2 are equal, a drain current with the same value flows in the transistors P1 and P2. Accordingly, the current with the same value is applied to the transistors Q1 and Q2.

As described above, the transistor Q1 is formed by one npn transistor and the transistor Q2 is formed by M npn transistors. Thus, a current flowing in each npn transistor included in the transistor Q2 is less than a current flowing in one npn transistor included in the transistor Q1.

Accordingly, a base-emitter voltage Vbe1 of the transistor Q1 is greater than a base-emitter voltage Vbe2 of the transistor Q2. As a result, a voltage corresponding to a difference between the base-emitter voltage Vbe1 and the base-emitter voltage Vbe2 is applied to the resistor R1.

Here, since the difference between the base-emitter voltage Vbe1 and the base-emitter voltage Vbe2 has a positive correlation with temperature, a current flowing in the resistor R1 also has a positive correlation with temperature. Since a current flowing in the resistor R1 is a drain current of the transistor P2, a drain current of the transistor P2 also has a positive correlation with temperature.

The transistors P1, P2, and P3 form a current mirror circuit and drain currents of the transistors P1 and P2 are a drain current of the transistor P3 as they are. The drain current of the transistor P3 flows in the transistor N1.

The transistors N1 and N2 form the current mirror circuit, and thus a drain current of the transistor N1 is a drain current of the transistor N2 as it is. The drain current of the transistor N2 is the PTAT current Ip which is an output current of the PTAT current generation unit 20.

Since the PTAT current Ip is equal to the drain current of the transistor P2 that has the positive correlation with temperature, the PTAT current Ip has a positive correlation with temperature like the drain current of the transistor P2.

Hereinafter, temperature dependency is obtained by obtaining the PTAT current Ip through calculation.

A potential V1 of the collector of the transistor Q1 and a potential V2 of the collector of the transistor Q2 are given by the following Expressions (1) and (2).

$$V1 = (k/q) \cdot T \cdot \ln(I1/Is) \quad (1)$$

$$V2 = (k/q) \cdot T \cdot \ln(I1/(M \cdot Is)) \quad (2)$$

Here, k is the Boltzmann's constant ($1.38 \times 10^{-23}$ (J/K)), q is an elementary charge ($1.6 \times 10^{19}$ (C)), T is absolute temperature (K), and Is is a reverse saturation current (A).

A drain current I1 of the transistor P1 is given by the following Expression (3).

$$I1 = (V1 - V2)/R1 \quad (3)$$

Here, the drain current I1 of the transistor P1 is equal to the PTAT current Ip, and thus the PTAT current Ip is given by the following Expression (4).

$$Ip = I1 = (k/q) \cdot T \cdot \ln(M)/R1 \quad (4)$$

As understood from Expression (4), by connecting M npn transistors which are the same as the transistor Q1 in parallel to form the transistor Q2, it is possible to cancel a value of the reverse saturation current Is of the npn transistor at the drain current I1 of the transistor P1.

Accordingly, according to the embodiment, it is possible to output the PTAT current Ip that has the positive correlation with temperature. The PTAT current generation unit 20 according to the embodiment is not limited to the example of FIG. 3 and may have any configuration as long as the PTAT current Ip that has the positive correlation with temperature can be output.

The cutoff switch 21 cuts off the PTAT current Ip supplied from the PTAT current generation unit 20. The cutoff switch 21 is provided, for example, between the PTAT current generation unit 20 and the current-voltage conversion unit 22.

The cutoff switch 21 is not limited to the case in which the cutoff switch 21 is provided, for example, between the PTAT current generation unit 20 and the current-voltage conversion unit 22, the cutoff switch 21 may be provide inside the PTAT current generation unit 20 (for example, between the transistors P3 and N1 illustrated in FIG. 3).

The current-voltage conversion unit 22 is, for example, a resistor provided between the power voltage Vdd and the cutoff switch 21. The current-voltage conversion unit 22 converts the PTAT current Ip of the analog signal supplied from the PTAT current generation unit 20 via the cutoff switch 21 into a PTAT voltage Vp. That is, the PTAT voltage Vp is an analog signal that has a positive correlation with temperature.

FIG. 2 is referred back to for description. The A/D conversion unit 23 converts the PTAT voltage Vp of the analog signal output from the current-voltage conversion unit 22 into temperature data of a digital signal.

The correction unit 24 corrects the temperature data output from the A/D conversion unit 23 and outputs the corrected temperature data to the outside of the temperature measurement unit 18. For example, the correction unit 24 can correct the temperature data by reading a parameter 26 stored in the storage unit 25 and inputting the parameter 26 and the temperature data into a predetermined correction calculation expression E (see FIG. 4).

The parameter 26 can be calculated by acquiring a value of the temperature data output as a predetermined temperature (for example, 60° C.) in advance, for example, before shipping of the imaging device 1.

The storage unit 25 that stores the parameter 26 is configured as a storage medium such as a semiconductor memory or a hard disk and stores a program and data for processing performed by the temperature measurement unit 18. A part of the program and data according to the present disclosure may be acquired from an external data source (for example, a data server, a network storage, or an externally attached memory) without being stored in the storage unit 25.

In the embodiment, in each imaging device 1, by performing the foregoing calibration, it is possible to output the highly accurate temperature data in which a manufacturing variation or the like is corrected.

In the embodiment, the correction unit 24 can output further highly accurate temperature data by including a parameter of the power voltage Vdd in the correction calculation expression E. This is because the PTAT current Ip which is a source of the temperature data varies with a variation in the power voltage Vdd. When the parameter of the power voltage Vdd is included in the correction calculation expression E, the temperature measurement unit 18 may have a function of monitoring the power voltage Vdd.

[Calibration Method]

Figure 4:
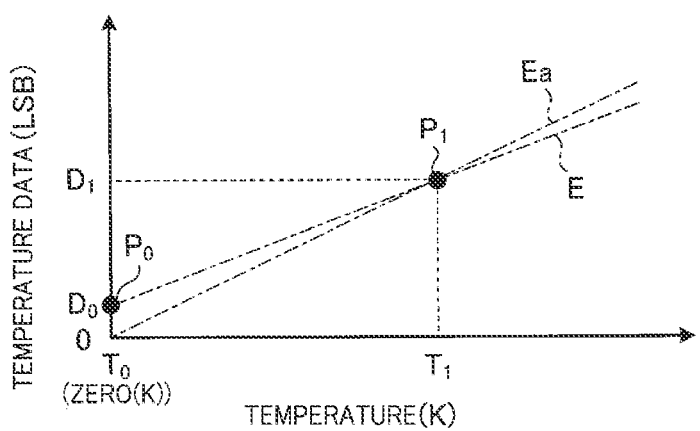
FIG. 4 is a diagram schematically illustrating a calibration method according to the embodiment of the present disclosure.

Next, the details of the calibration method in the temperature measurement unit 18 will be described with reference to FIGS. 4 to 6. FIG. 4 is a diagram schematically illustrating a calibration method according to the embodiment of the present disclosure.

In the embodiment, by causing the cutoff switch 21 to enter a cutoff state, the PTAT current Ip supplied from the PTAT current generation unit 20 is cut off. Thus, an output of the PTAT current Ip can be set to zero, and thus a state in which a test temperature is zero (K) can be simulated in the temperature measurement unit 18.

Subsequently, in the embodiment, the current-voltage conversion unit 22 converts the cutoff PTAT current Ip into a PTAT voltage Vp and the A/D conversion unit 23 converts the PTAT voltage Vp to temperature data $D_0$.

In the embodiment, as illustrated in FIG. 4, the temperature data $D_0$ at temperature T0 corresponding to zero (K) is plotted as a correction point $P_0$ on the rectangular coordinate system. The temperature data $D_0$ does not necessarily become zero even when the PTAT current Ip is zero. This is because offset occurs in an output value of the A/D conversion unit 23 or the current-voltage conversion unit 22 in the temperature measurement unit 18.

Subsequently, in the embodiment, by causing the cutoff switch 21 to enter a connection state, the PTAT current Ip is supplied from the PTAT current generation unit 20 to the current-voltage conversion unit 22. In the embodiment, the imaging device 1 is in an environment of a predetermined temperature $T_1$. That is, a text temperature for calibration is set to the temperature $T_1$.

Subsequently, in the embodiment, the PTAT current Ip supplied from the PTAT current generation unit 20 is converted into the PTAT voltage Vp by the current-voltage conversion unit 22. The PTAT voltage Vp is converted into temperature data $D_1$ by the A/D conversion unit 23. In the embodiment, as illustrated in FIG. 4, the temperature data $D_1$ at the temperature $T_1$ is plotted as a correction point $P_1$ on the rectangular coordinate system.

Subsequently, in the embodiment, the parameter 26 (see FIG. 2) of the correction calculation expression E is calculated based on the plotted correction points $P_0$ and $P_1$. For example, as illustrated in FIG. 4, by linearly approximating the two correction points $P_0$ and P1, it is possible to calculate the parameter 26 of the correction calculation expression E indicated by a one-dot dashed line.

That is, in the embodiment, when calibration is performed at one test temperature (the temperature $T_1$), the two correction points $P_0$ and P1 more than the number of test temperatures can be plotted on the rectangular coordinate system. Accordingly, according to the embodiment, it is possible to improve accuracy of the calibration without an increase in the number of test temperatures at which the calibration is performed.

In the embodiment, as illustrated in FIG. 4, it is possible to improve the accuracy of the calibration compared to a correction calculation expression Ea obtained by considering temperature data to be zero (LSB) when a test temperature is zero (K).

This is because it is not appropriate that the temperature data is considered to be zero (LSB) when the test temperature is zero (K) (that is, the PTAT current Ip is zero) since offset occurs in the output value in the A/D conversion unit 23, the current-voltage conversion unit 22, or the like, as described above.

As described above, in the embodiment, by performing processing to cut off the PTAT current Ip with the cutoff switch 21, it is possible to improve the accuracy of the calibration without an increase in the number of test temperatures at which the calibration is performed.

In the example of FIG. 4, the case in which the number of test temperatures is 1 (the temperature $T_1$) has been described, but the calibration method according to the embodiment is not limited to the case in which the number of test temperature is 1. FIG. 5 is a diagram schematically illustrating a calibration method according to Modification Example 1 of the embodiment of the present disclosure. FIG. 6 is a diagram schematically illustrating a calibration method according to Modification Example 2 of the embodiment of the present disclosure.

Figure 5:
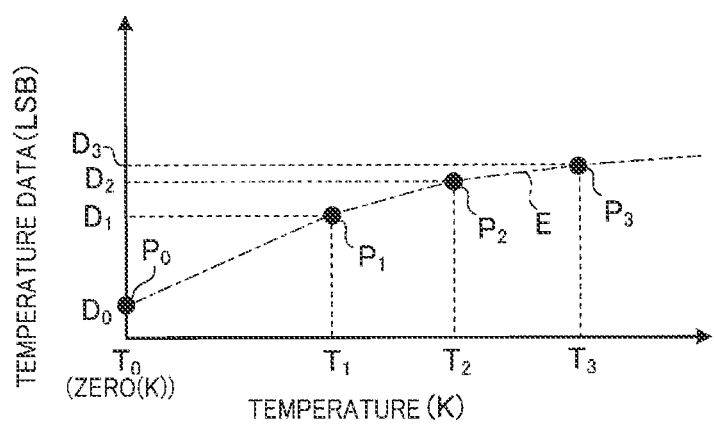
FIG. 5 is a diagram schematically illustrating a calibration method according to Modification Example 1 of the embodiment of the present disclosure.

As illustrated in FIG. 5, in Modification Example 1, calibration is performed at a plurality of test temperatures (temperatures $T_1$, $T_2$, $T_3$, and the like). That is, in addition to the processing described above in the example of FIG. 4, the test temperatures are set to the temperatures $T_2$, $T_3$, and the like and pieces of temperature data $D_2$, $D_3$, and the like output based on the PTAT current Ip at the test temperatures are plotted as correction points $P_2$, $P_3$, and the like on the rectangular coordinate system.

The parameter 26 (see FIG. 2) of the correction calculation expression E is calculated based on the plotted correction points $P_0$, $P_1$, $P_2$, $P_3$, and the like. Thus, since three or more correction points $P_0$, $P_1$, $P_2$, $P_3$, and the like can be plotted on the rectangular coordinate system, it is possible to further improve the accuracy of the calibration.

Figure 6:
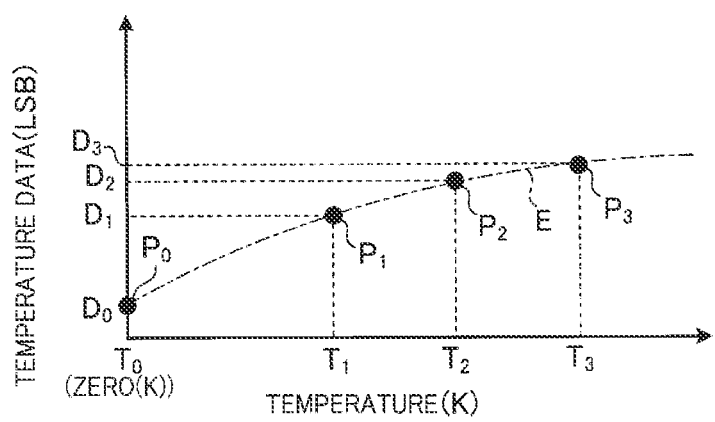
FIG. 6 is a diagram schematically illustrating a calibration method according to Modification Example 2 of the embodiment of the present disclosure.

When three or more correction points $P_0$, P1, P2, P3, and the like can be plotted, the correction calculation expression E may be piecewise approximated (brokenly approximated), as illustrated in FIG. 5 or the correction calculation expression E may be polynomially approximated (curvedly approximated), as illustrated in FIG. 6.

In the embodiment, of a plurality of electrode pads provided in the imaging device 1, two electrode pads may be set as thermocouple pads and test temperatures may be measured in the above-described calibration processing using the two thermocouple pads.

Thus, even when an in-plane temperature distribution of a wafer is not uniform in each calibration processing of the plurality of imaging devices 1 which are a wafer state before individual chips are cut off, the above-described calibration processing can be performed with high accuracy.

[Modification Examples of Temperature Measurement Unit]

Figure 7:
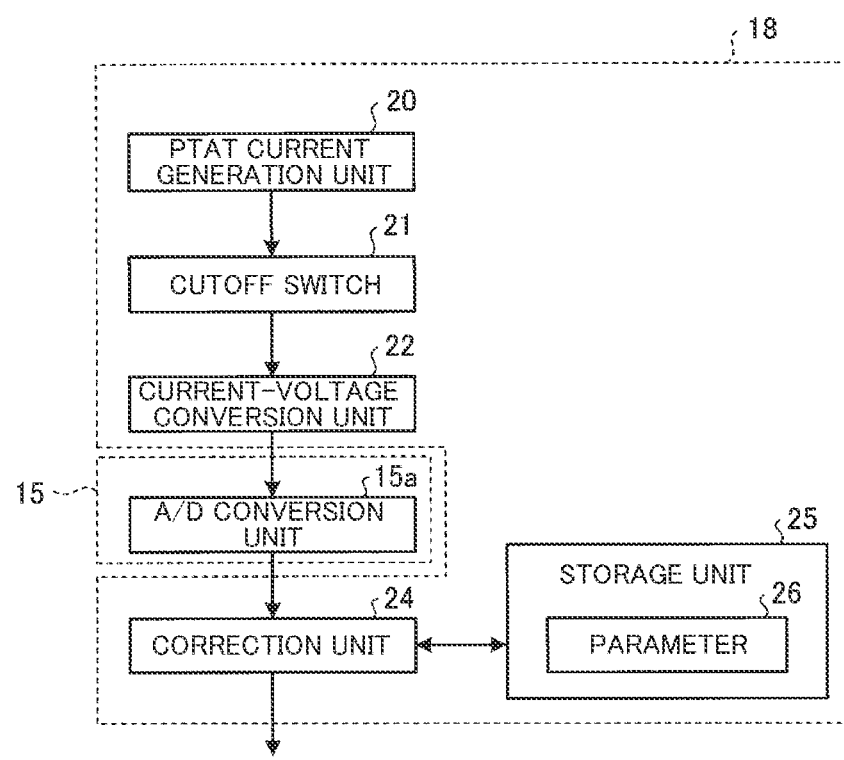
FIG. 7 is a system configuration diagram illustrating an overall configuration example of a temperature measurement unit according to Modification Example 3 of the embodiment of the present disclosure.

Next, various modification examples of the temperature measurement unit 18 will be described with reference to FIGS. 7 and 8. FIG. 7 is a system configuration diagram illustrating an overall configuration example of the temperature measurement unit 18 according to Modification Example 3 of the embodiment of the present disclosure.

As illustrated in FIG. 7, in Modification Example 3, not the A/D conversion unit 23 (see FIG. 2) provided inside the temperature measurement unit 18 but an A/D conversion unit 15a provided inside the column signal processing unit 15 is used to perform the A/D conversion processing on the PTAT voltage Vp. That is, in Modification Example 3, the A/D conversion unit 15a is shared between the column signal processing unit 15 and the temperature measurement unit 18.

In this way, by sharing the A/D conversion unit 15a between the column signal processing unit 15 and the temperature measurement unit 18, it is possible to simplify a circuit configuration of the entire imaging device 1. Thus, according to Modification Example 3, it is possible to reduce cost of the imaging device 1.

FIG. 8 is a system configuration diagram illustrating an overall configuration example of the temperature measurement unit 18 according to Modification Example 4 of the embodiment of the present disclosure. As illustrated in FIG. 8, in Modification Example 4, a plurality of A/D conversion units 15a, 15b, and the like provided inside the column signal processing unit 15 are used to perform the A/D conversion processing on the PTAT voltage Vp.

Thus, since results of the plurality steps of A/D conversion processing are averaged and random noise can be reduced, it is possible to measure the temperature around the pixel array unit 10 with higher accuracy.

As in the example of FIG. 8, when the plurality of A/D conversion units 15a, 15b, and the like are used to perform the A/D conversion processing on the PTAT voltage Vp, the plurality of A/D conversion units 15a, 15b, and the like may be used to perform the above-described calibration processing in advance.

That is, the correction unit 24 may calculate the parameter 26 based on the plurality of pieces of temperature data converted based on which cutoff PTAT current IP by the plurality of A/D conversion units, and the plurality of pieces of temperature data converted by the plurality of A/D conversion units based on the PTAT current Ip at the predetermined test temperature.

Thus, it is possible to further improve the accuracy of the calibration without an increase in the number of test temperatures at which the calibration is performed.

In the examples of FIGS. 7 and 8, the examples in which the A/D conversion unit 15a and the like provided inside the column signal processing unit 15 are shared by the temperature measurement unit 18 have been described. However, the A/D conversion units shared by the temperature measurement unit 18 is not limited to the A/D conversion unit 15a and the like provided in the column signal processing unit 15.

For example, when the A/D conversion unit is provided inside each unit (for example, the signal processing unit 17) of the imaging device 1 illustrated in FIG. 1, the A/D conversion unit may be shared with the temperature measurement unit 18.

[Details of Processing Performed by Temperature Measurement Unit]

Next, the details of processing performed by the temperature measurement unit 18 according to the embodiment will be described with reference to FIGS. 9 and 10.

Figure 9:
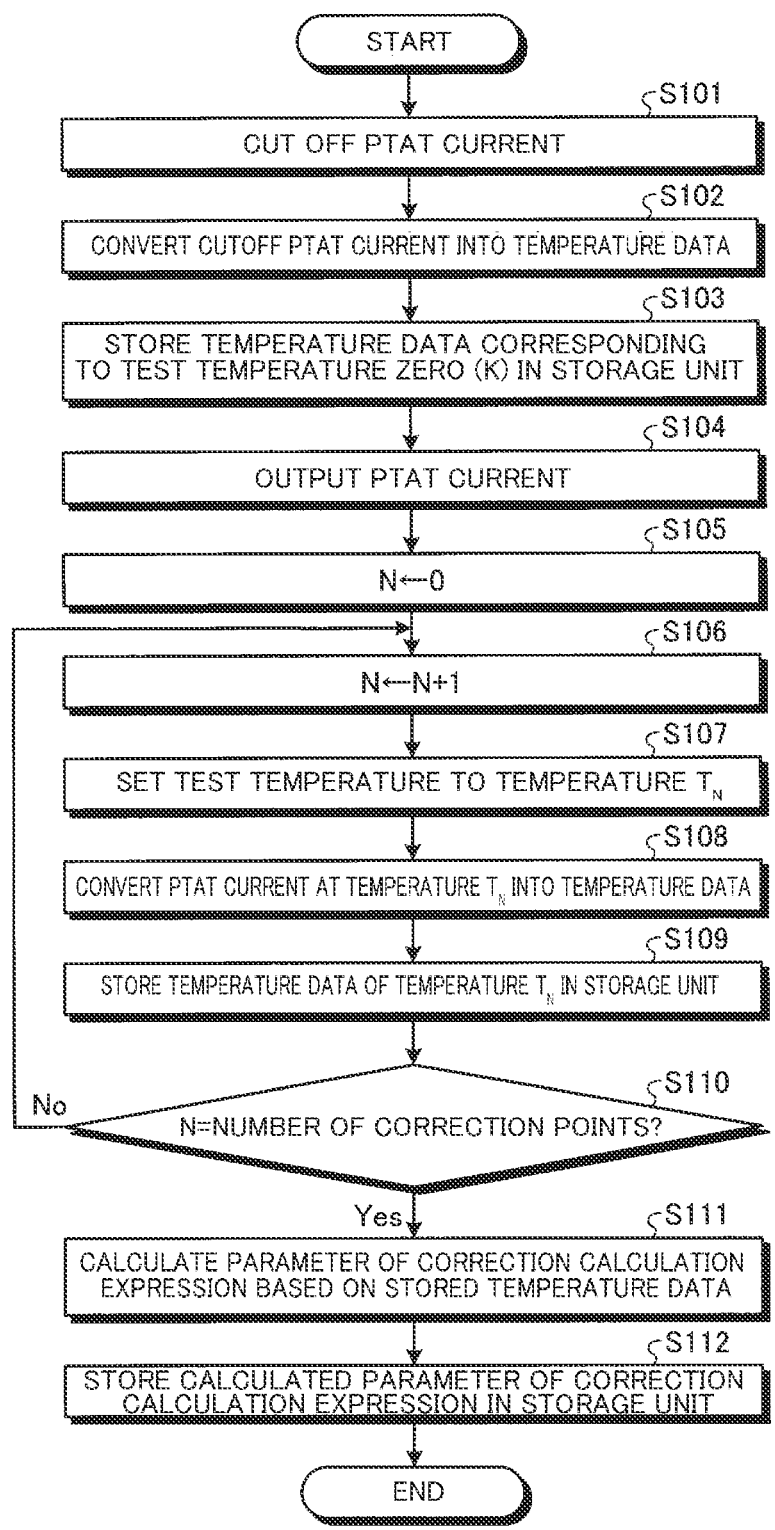
FIG. 9 is a flowchart illustrating a processing procedure of the calibration method according to the embodiment of the present disclosure.

FIG. 9 is a flowchart illustrating a processing procedure of the calibration method according to the embodiment of the present disclosure.

First, the temperature measurement unit 18 controls the cutoff switch 21 such that f the PTAT current Ip supplied from the PTAT current generation unit 20 is cut off (step S101). Then, the temperature measurement unit 18 converts the cutoff PTAT current Ip into the temperature data $D_0$ (step S102).

For example, in the temperature measurement unit 18, the current-voltage conversion unit 22 converts the cutoff PTAT current Ip into the PTAT voltage Vp and the A/D conversion unit 23 converts the PTAT voltage Vp into the temperature data $D_0$. The temperature measurement unit 18 stores the temperature data $D_0$ corresponding to the test temperature of zero (K) in the storage unit 25 (step S103).

Subsequently, the temperature measurement unit 18 causes the cutoff switch 21 to enter the connection state and the PTAT current Ip is output from the PTAT current generation unit 20 to the current-voltage conversion unit 22 (step S104). Then, the temperature measurement unit 18 sets the number of test temperatures N to zero (step S105) and adds 1 to the number of test temperatures N (step S106).

Subsequently, the temperature measurement unit 18 sets the test temperature to a predetermined temperature $T_N$ (step S107). Then, the temperature measurement unit 18 converts the PTAT current IP at a temperature $T_N$ into temperature data $D_N$ (step S108).

For example, in the temperature measurement unit 18, the current-voltage conversion unit 22 converts the PTAT current Ip at the temperature $T_N$ into the PTAT voltage Vp and the A/D conversion unit 23 converts the PTAT voltage Vp into the temperature data $D_N$. Then, the temperature measurement unit 18 stores the temperature data $D_N$ at the temperature $T_N$ in the storage unit 25 (step S109).

Subsequently, the temperature measurement unit 18 determines whether the number of test temperatures N is a predetermined number of correction points (step S110). When the number of test temperatures N is the predetermined number of correction points (Yes in step S110), the temperature measurement unit 18 calculates the parameter 26 calculates the parameter 26 of the correction calculation expression E based on pieces of stored temperature data $D_0, \ldots, D_N$ (step S111).

Finally, the temperature measurement unit 18 stores the calculated parameter 26 of the correction calculation expression E in the storage unit 25 (step S112) and ends the processing. When the number of test temperatures N is not the predetermined number of correction points in step S110 (No in step S110), the processing returns to step S106.

In the embodiment, the processing of the above-described steps S104 to S110 may be performed earlier than the processing of steps S101 to S103. When the number of test temperatures N is equal to or greater than 2, the processing of steps S101 to S103 may be performed between the processing of steps S107 to S109 at a certain test temperature and the processing of steps S107 to S109 at a subsequent test temperature.

Figure 10:
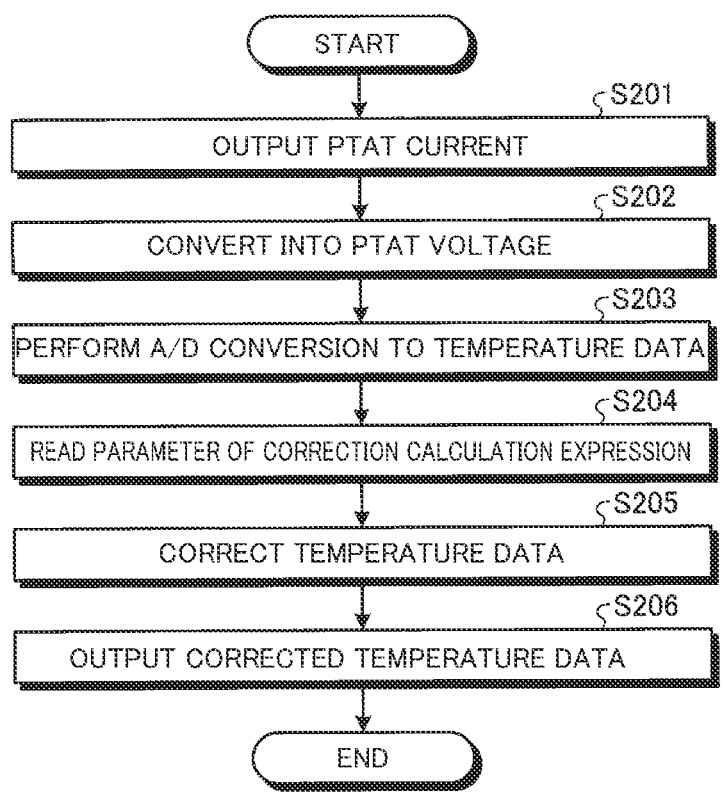
FIG. 10 is a flowchart illustrating a processing procedure of a method of correcting temperature data according to the embodiment of the present disclosure.

FIG. 10 is a flowchart illustrating a processing procedure of a method of correcting the temperature data according to the embodiment of the present disclosure. First, the temperature measurement unit 18 causes the cutoff switch 21 to enter the connection state and outputs the PTAT current Ip from the PTAT current generation unit 20 to the current-voltage conversion unit 22 (step S201).

Subsequently, in the temperature measurement unit 18, the current-voltage conversion unit 22 converts the PTAT current Ip into the PTAT voltage Vp (step S202). Then, in the temperature measurement unit 18, the A/D conversion unit 23 performs A/D conversion from the PTAT voltage Vp to the temperature data (step S203).

Subsequently, the temperature measurement unit 18 reads the parameter 26 of the correction calculation expression E stored in the storage unit 25 to the correction unit 24 (step S204). Then, in the temperature measurement unit 18, the correction unit 24 corrects the temperature data obtained through the A/D conversion by the A/D conversion unit 23 based on the read parameter 26 of the correction calculation expression E (step S205).

Finally, the temperature measurement unit 18 outputs the corrected temperature data to the outside (step S206) and ends the processing.

Advantageous Effects

The imaging device 1 according to the embodiment includes the pixel array unit 10 that includes the pixels (the unit pixels 11), the analog signal generation unit (the PTAT current generation unit 20), the A/D conversion unit 23 (15a and 15b), and the switch (the cutoff switch 21). The analog signal generation unit (the PTAT current generation unit 20) generates the analog signal (the PTAT current Ip) based on the temperature around the pixel array unit 10. The A/D conversion unit 23 (15a and 15b) converts the analog signal (the PTAT current Ip) into the digital signal (the temperature data). The switch (the cutoff switch 21) cuts off the analog signal (the PTAT current Ip) to be supplied to the A/D conversion unit 23 (15a and 15b).

Thus, it is possible to improve the accuracy of the calibration without an increase in the number of test temperatures at which the calibration is performed.

In the imaging device 1 according to the embodiment, the switch (the cutoff switch 21) is provided between the analog signal generation unit (the PTAT current generation unit 20) and the A/D conversion unit 23 (15*a* and 15*b*).

Thus, it is possible to perform the cutting reliably before the PTAT current Ip output from the PTAT current generation unit 20 is supplied to the A/D conversion unit 23.

In the imaging device 1 according to the embodiment, the pixels (the unit pixels 11) generate the image data which is an analog signal and the A/D conversion unit 15*a* (15*b*) performs the A/D conversion on the image data.

Thus, since the circuit configuration of the entire imaging device 1 can be simplified, it is possible to reduce cost of the imaging device 1.

The imaging device 1 according to the embodiment further includes the correction unit 24 that corrects the digital signal (the temperature data).

Thus, in each imaging device 1, it is possible to output highly accurate temperature data in which a manufacturing variation or the like is corrected.

In the imaging device 1 according to the embodiment, the correction unit 24 calculates the parameter 26 of the correction calculation expression E for correcting the digital signal (the temperature data) based on a first digital signal (the temperature data $D_0$) and a second digital signal (the temperature data $D_N$). The first digital signal (the temperature data $D_0$) is generated by performing the A/D conversion on the analog signal (the PTAT current Ip) cut off by the switch (the cutoff switch 21). The second digital signal (the temperature data $D_N$) is generated by performing the A/D conversion on the analog signal (the PTAT current Ip) generated by the analog signal generation unit (the PTAT current generation unit 20).

Thus, it is possible to improve the accuracy of the calibration without an increase in the number of test temperatures at which the calibration is performed.

In the imaging device 1 according to the embodiment, the plurality of A/D conversion units 15*a*, 15*b*, and the like are provided. The correction unit 24 calculates the parameter 26 of the correction calculation expression E based on the first digital signal (the temperature data $D_0$) and the second digital signal (the temperature data $D_N$) each converted by the plurality of A/D conversion units 15*a*, 15*b*, and the like.

Thus, it is possible to further improve the accuracy of the calibration without an increase in the number of test temperatures at which the calibration is performed.

In the imaging device 1 according to the embodiment, the correction unit 24 corrects the digital signal (the temperature data) based on a measurement value of the power voltage Vdd.

Thus, it is possible to output the temperature data with higher accuracy.

In the imaging device 1 according to the embodiment, the analog signal (the PTAT current Ip) is a current value.

Thus, it is possible to generate the analog signal proportional to absolute temperature using the PTAT current generation unit 20.

A calibration method according to the embodiment includes a signal cutting step, a first A/D conversion step, an analog signal outputting step, a second A/D conversion step, and a calculation step. In the signal cutting step (step S101), the analog signal (the PTAT current Ip) generated based on a temperature is cut off. In the first A/D conversion step (step S102), the cutoff analog signal (the PTAT current Ip) is converted into the first digital signal (the temperature data $D_0$). In the analog signal outputting step (step S104), the analog signal (the PTAT current Ip) is output.

In the second A/D conversion step (step S108), the analog signal (the PTAT current Ip) is converted into the second digital signal (the temperature data $D_N$). In the calculation step (step S111), the parameter 26 of the correction calculation expression E for correcting the digital signal (the temperature data) converted from the analog signal (the PTAT current Ip) generated based on the temperature around the pixel array unit 10 through the A/D conversion is calculated. In the calculation step (step S111), the parameter 26 of the correction calculation expression E is calculated based on the first digital signal (the temperature data $D_0$) and the second digital signal (the temperature data $D_N$).

Thus, it is possible to improve the accuracy of the calibration without an increase in the number of test temperatures at which the calibration is performed.

[Application Example to Moving Body]

The technology of the present disclosure (the present technology) can be applied in various products. For example, the technology of the present disclosure may be realized as a device mounted on any type of moving body such as an automobile, an electric automobile, a hybrid electric automobile, a motorcycle, a bicycle, a personal mobility, an airplane, a drone, a ship, and a robot.

Figure 11:
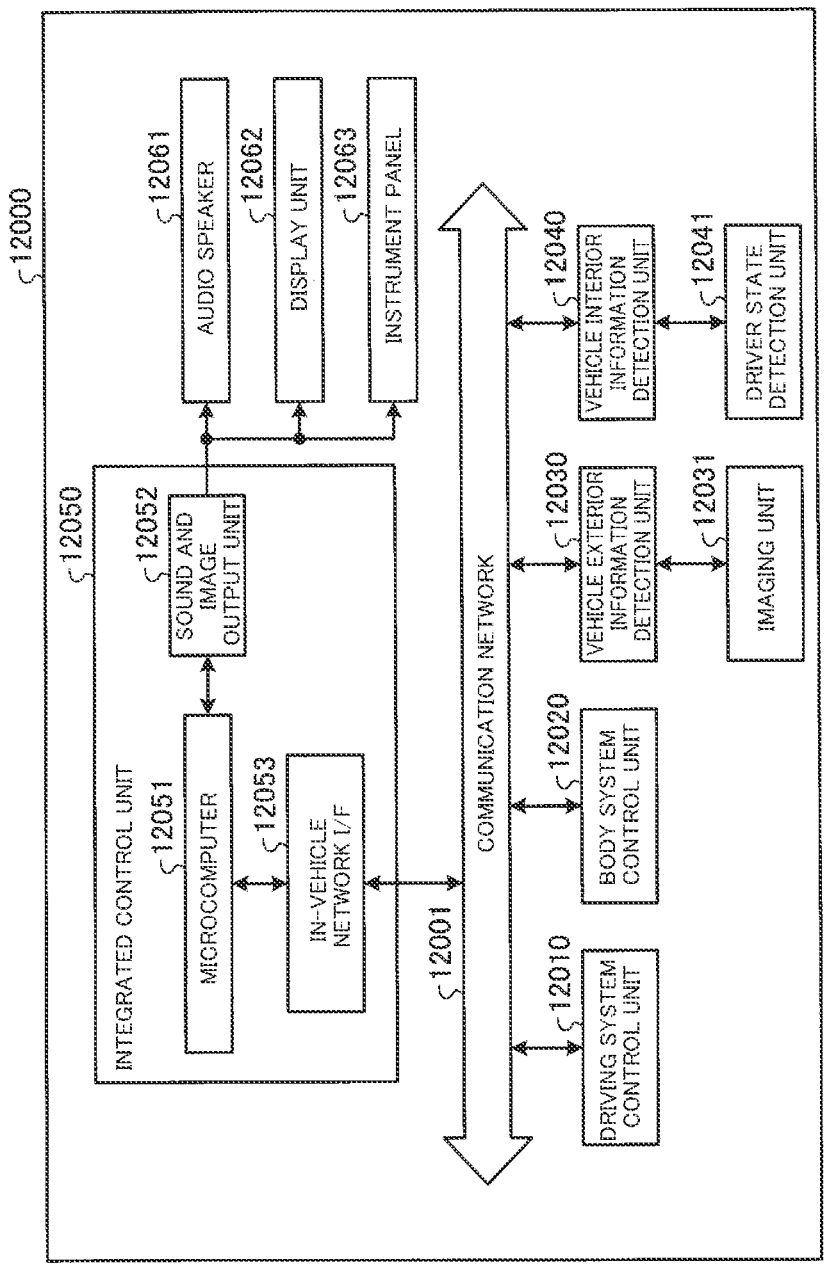
FIG. 11 is a block diagram illustrating an example of an overall configuration of a vehicle control system.

FIG. 11 is a block diagram illustrating an example of an overall configuration of a vehicle control system which is an example of a moving object control system to which the technology of the present technology can be applied.

A vehicle control system 12000 includes a plurality of electronic control units connected via a communication network 12001. In the example illustrated in FIG. 11, the vehicle control system 12000 includes a driving system control unit 12010, a body system control unit 12020, a vehicle exterior information detection unit 12030, a vehicle interior information detection unit 12040, and an integrated control unit 12050. As a functional configuration of the integrated control unit 12050, a microcomputer 12051, a sound and image output unit 12052, and an in-vehicle network interface (I/F) 12053 are illustrated.

The driving system control unit 12010 controls an operation of a device related to a driving system of a vehicle in accordance with various programs. For example, the driving system control unit 12010 functions as a control device such as a driving force generation device that generates a driving force of a vehicle, such as an internal combustion engine or a driving motor, a driving force transmission mechanism that transmits a driving force to wheels, a steering mechanism that adjusts a rudder angle of the vehicle, and a braking device that generates a braking force of the vehicle.

The body system control unit 12020 controls operations of various devices equipped in a vehicle body in accordance with various programs. For example, the body system control unit 12020 functions as a keyless entry system, a smart key system, a power window device, or a control device of various lamps such as a head lamp, a back lamp, a brake lamp, a turn signal, and a fog lamp. In this case, radio waves transmitted from a portable device with which a key is substituted or signals of various switches may be input to the body system control unit 12020. The body system control unit 12020 receives an input of the radio waves or the signals and controls a door locking device, a power window device, lamps, and the like of the vehicle.

The vehicle exterior information detection unit 12030 detects external information of the vehicle on which the vehicle control system 12000 is mounted. For example, imaging unit 12031 is connected to the vehicle exterior information detection unit 12030. The vehicle exterior information detection unit 12030 causes the imaging unit 12031 to capture vehicle exterior images and receives the captured images. Based on the received images, the vehicle exterior information detection unit 12030 may perform an object detection process or a distance detection process for people, vehicles, obstacles, signs, letters on road surfaces, and the like.

The imaging unit 12031 is an optical sensor that receives light and outputs an electric signal in accordance with an amount of received light. The imaging unit 12031 can output the electric signal as an image or can also output the electric signal as distance measurement information. The light received by the imaging unit 12031 may be visible light or may be invisible light such as infrared light.

The vehicle interior information detection unit 12040 detects vehicle interior information. For example, a driver state detection unit 12041 that detects a driver state is connected to the vehicle interior information detection unit 12040. The driver state detection unit 12041 includes, for example, a camera that images a driver. Based on detection information input from the driver state detection unit 12041, the vehicle interior information detection unit 12040 may calculate a fatigue degree or a concentration degree of the driver or may determine whether the driver is dozing.

The microcomputer 12051 can calculate a control target value of the driving force generation device, the steering mechanism, or the braking device based on information regarding the vehicle exterior and interior acquired by the vehicle exterior information detection unit 12030 or the vehicle interior information detection unit 12040, and can output a control instruction to the driving system control unit 12010. For example, the microcomputer 12051 can perform coordinated control for realizing an ADAS (Advanced Driver Assistance System) function including vehicle collision avoidance, shock alleviation, following travel based on an inter-vehicle distance, vehicle speed maintenance travel, a vehicle collision warning, or a vehicle lane deviation warning.

The microcomputer 12051 can perform coordinated control for automated driving or the like in which autonomous travel is performed without an operation of a driver by controlling the driving force generation device, the steering mechanism, the braking device, and the like based on information regarding the vicinity of the vehicle acquired by the vehicle exterior information detection unit 12030 or the vehicle interior information detection unit 12040.

The microcomputer 12051 can output a control instruction to the body system control unit 12020 based on information regarding the vehicle exterior acquired by the vehicle exterior information detection unit 12030. For example, the microcomputer 12051 can perform coordinated control for achieving antidazzle such as switching of a high beam to a low beam by controlling the head lamp in accordance with a position of a front vehicle or an oncoming vehicle detected by the vehicle exterior information detection unit 12030.

The sound and image output unit 12052 transmits an output signal of at least one of a sound and an image to an output device capable of notifying an occupant of the vehicle or the vehicle exterior of information visually or auditorily. In the example of FIG. 11, an audio speaker 12061, a display unit 12062, and an instrument panel 12063 are exemplified as the output device. The display unit 12062 may include for example, at least one of an onboard display and a head-up display.

Figure 12:
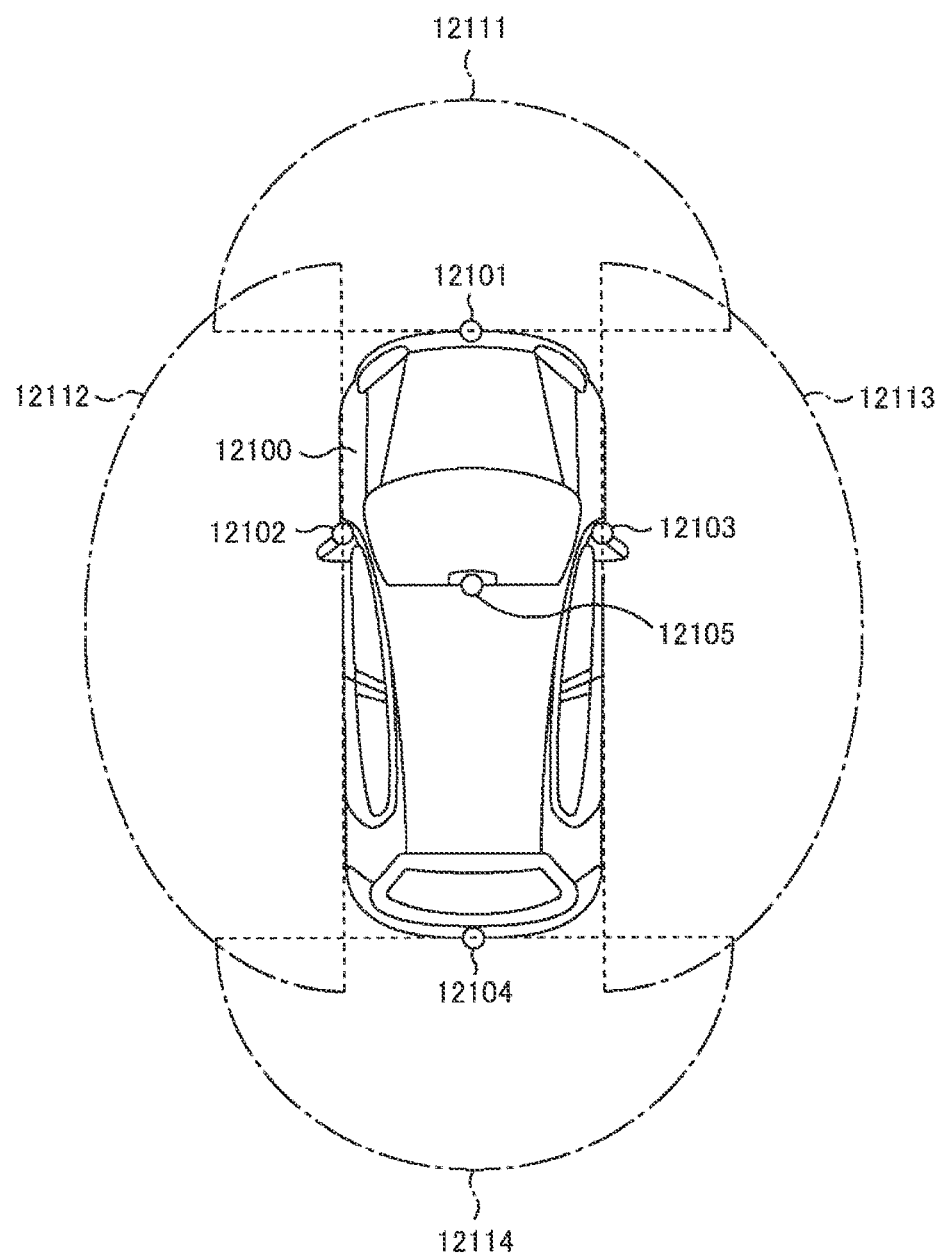
FIG. 12 is a diagram illustrating an example of positions at which a vehicle exterior information detection unit and an imaging unit are installed.

FIG. 12 is a diagram illustrating an example of positions at which the imaging unit 12031 is installed.

In FIG. 12, imaging units 12101, 12102, 12103, 12104, and 12105 are included as the imaging unit 12031.

The imaging units 12101, 12102, 12103, 12104, and 12105 are provided, for example, at positions such as a front nose, side mirrors, a rear bumper, a backdoor, and an upper portion of a front glass of the vehicle interior of the vehicle 12100. The imaging unit 12101 provided in the front nose and the imaging unit 12105 provided in the upper portion of the front glass inside the vehicle mainly acquire images on the front side of the vehicle 12100. The imaging units 12102 and 12103 provided in the side mirrors mainly acquire images on the lateral sides of the vehicle 12100. The imaging unit 12104 provided in the rear bumper or the backdoor mainly acquires images on the rear side of the vehicle 12100. The imaging unit 12105 included in the upper portion of the front glass inside the vehicle is mainly used to detect front vehicles or pedestrians, obstacles, traffic signals, traffic signs, lanes, and the like.

FIG. 12 illustrates an example of imaging ranges of the imaging units 12101 to 12104. An imaging range 12111 is an imaging range of the imaging unit 12101 provided in the front nose, imaging ranges 12112 and 12113 are imaging ranges of the imaging unit 12102 and 12103 provided in the side mirrors, and an imaging range 12114 is an imaging range of the imaging unit 12104 provided in the rear bumper or the backdoor. For example, by superimposing the image data captured by the imaging units 12101 to 12104, it is possible to obtain a bird's eye view image in which the vehicle 12100 is viewed from the upper side.

At least one of the imaging units 12101 to 12104 may have a function of acquiring distance information. For example, at least one of the imaging units 12101 to 12104 may be a stereo camera including a plurality of imaging elements or may be an imaging element that has pixels for phase difference detection.

For example, the microcomputer 12051 can extract a 3-dimensional object traveling at a predetermined speed (for example, 0 km/h or more) in substantially the same direction as that of the vehicle 12100 which is particularly a closest 3-dimensional object on a travel road of the vehicle 12100 as a front vehicle by obtaining a distance from each 3-dimensional object within the imaging ranges 12111 to 12114 and a temporal change of the distance (a relative speed to the vehicle 12100) based on the distance information obtained from the imaging units 12101 to 12104. Further, the microcomputer 12051 can set an inter-vehicle distance which is guaranteed in advance before a front vehicle and perform automated brake control (also including following stop control) or automated acceleration control (also including following start control). In this way, it is possible to perform the coordinated control for automated driving or the like in which autonomous travel is performed without an operation of a driver.

For example, the microcomputer 12051 can classify and extract 3-dimensional object data regarding 3-dimensional objects into motorcycles, normal vehicles, large vehicles, pedestrians, electric poles, and the like into other 3-dimensional objects based on the distance information obtained from the imaging units 12101 to 12104, and can use the 3-dimensional objects for automatic avoidance of obstacles. For example, the microcomputer 12051 identifies obstacles around the vehicle 12100 as obstacles which can be recognized by the driver of the vehicle 12100 and obstacles which it is difficult to recognize. Then, the microcomputer 12051 determines a collision risk indicating a risk of collision with each obstacle. In a situation in which there is a possibility of collision at which the collision risk is equal to or greater than a set value, driving support for collision avoidance can be performed by outputting a warning to the driver via the audio speaker 12061 or the display unit 12062 or performing forced deceleration or avoidance steering via the driving system control unit 12010.

At least one of the imaging units 12101 to 12104 may be an infrared camera that detects infrared light. For example, the microcomputer 12051 can recognize pedestrians by determining whether there are the pedestrians in images captured by the imaging units 12101 to 12104. The pedestrians are recognized, for example, in an order in which feature points in the images captured by the imaging units 12101 to 12104 serving as infrared cameras are extracted and an order in which a pattern matching process is performed on a series of feature points indicating the contour of an object to determine whether there is a pedestrian. When the microcomputer 12051 determines that there is the pedestrian in the images captured by the imaging units 12101 to 12104 and recognizes the pedestrian, the sound and image output unit 12052 controls the display unit 12062 such that a rectangular contour line for emphasizing the recognized pedestrian is superimposed and displayed. The sound and image output unit 12052 may control the display unit 12062 such that an icon or the like indicating the pedestrian is displayed at a desired position.

The example of the vehicle control system to which the technology according to the present disclosure is applied has been described above. The technology of the present disclosure can be applied to the imaging unit 12031 and the like in the above-described configuration. Specifically, the imaging device 1 in FIG. 1 can be applied to the imaging unit 12031. By applying the technology according to the present disclosure to the imaging unit 12031, it is possible to impart the high accuracy fail-safe function to the imaging unit 12031.

The advantageous effects described in the present specification are merely exemplary and are not limited, and other advantageous effects may be obtained.

The present technology can be configured as follows.

(1)

An imaging device including:

a pixel array unit including pixels;

an analog signal generation unit configured to generate an analog signal based on a temperature around the pixel array unit;

an A/D conversion unit configured to convert the analog signal into a digital signal; and a switch configured to cut off the analog signal to be supplied to the A/D conversion unit.

(2)

The imaging device according to (1), wherein the switch is provided between the analog signal generation unit and the A/D conversion unit.

(3)

The imaging device according to (1) or (2), wherein the pixel generates image data which is an analog signal, and the A/D conversion unit performs A/D conversion on the image data.

(4)

The imaging device according to any one of (1) to (3), further including a correction unit configured to correct the digital signal.

(5)

The imaging device according to (4), wherein the correction unit calculates a parameter of a correction calculation expression for correcting the digital signal based on a first digital signal obtained through A/D conversion from the analog signal cut off by the switch and a second digital signal obtained through A/D conversion from the analog signal generated by the analog signal generation unit.

(6)

The imaging device according to (5), wherein a plurality of the A/D conversion units are provided, and the correction unit calculates the parameter of the correction calculation expression based on the first and second digital signals each converted by the plurality of A/D conversion units.

(7)

The imaging device according to any one of (4) to (6), further including the correction unit corrects the digital signal based on a measurement value of a power voltage.

(8)

The imaging device according to any one of (1) to (7), further including the analog signal is a current value.

(9)

A calibration method including:

a signal cutting step of cutting off an analog signal generated based on a temperature;

a first A/D conversion step of converting the cutoff analog signal into a first digital signal;

an analog signal outputting step of outputting the analog signal;

a second A/D conversion step of converting the analog signal into a second digital signal; and a calculation step of calculating a parameter of a correction calculation expression for correcting a digital signal obtained through A/D conversion from an analog signal generated based on a temperature around a pixel array unit, based on the first and second digital signals.

REFERENCE SIGNS LIST

1 Imaging device
10 Pixel array unit
15 Column signal processing unit
15*a*, 15*b* A/D conversion unit
18 Temperature measurement unit
20 PTAT current generation unit (example of analog signal generation unit)
21 Cutoff switch (an example of switch)
22 Current-voltage conversion unit
23 A/D conversion unit
24 Correction unit
25 Storage unit
26 Parameter
E Correction calculation expression

The invention claimed is:

1. An imaging device, comprising:

a pixel array unit including pixels;

an analog signal generation unit configured to generate an analog signal based on a temperature around the pixel array unit;

an analog to digital (A/D) conversion unit configured to convert the analog signal into a digital signal;

a switch configured to cut off the analog signal to be supplied to the A/D conversion unit; and a correction unit configured to calculate a parameter of a correction calculation expression for correction of the digital signal based on a first digital signal obtained through A/D conversion from the analog signal cut off by the switch and based on a second digital signal obtained through the A/D conversion from the analog signal generated by the analog signal generation unit.

2. The imaging device according to claim 1, wherein the switch is provided between the analog signal generation unit and the A/D conversion unit.

3. The imaging device according to claim 1, wherein
each of the pixels generates image data which is the analog signal, and
the A/D conversion unit is configured to perform A/D conversion on the image data.

4. The imaging device according to claim 1, further comprising the correction unit configured to correct the digital signal.

5. The imaging device according to claim 1, wherein
a plurality of A/D conversion units are provided, wherein the plurality of A/D conversion units includes the A/D conversion unit, and
the correction unit is configured to calculate the parameter of the correction calculation expression based on the first digital signal and the second digital signal each converted by the plurality of A/D conversion units.

6. The imaging device according to claim 4, wherein the correction unit is configured to correct the digital signal based on a measurement value of a power voltage.

7. The imaging device according to claim 1, wherein the analog signal is a current value.

8. A calibration method, comprising:
cutting off an analog signal generated based on a temperature;
converting the cutoff analog signal into a first digital signal;
outputting the analog signal;
converting the analog signal into a second digital signal; and
calculating a parameter of a correction calculation expression for correcting a digital signal obtained through analog to digital (A/D) conversion from the analog signal generated based on the temperature around a pixel array unit,
wherein the calculation of the parameter of the correction calculation expression for the correction of the digital signal is based on the first digital signal and the second digital signal.

* * * * *